US010575046B2

(12) United States Patent
Gilson

(10) Patent No.: US 10,575,046 B2
(45) Date of Patent: *Feb. 25, 2020

(54) APPARATUS AND METHOD FOR RECORDING CONTENT

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 331 days.

This patent is subject to a terminal disclaimer.

(21) Appl. No.: 15/357,317

(22) Filed: Nov. 21, 2016

(65) Prior Publication Data
US 2017/0295396 A1    Oct. 12, 2017

Related U.S. Application Data

(63) Continuation of application No. 14/600,326, filed on Jan. 20, 2015, now Pat. No. 9,538,123, which is a (Continued)

(51) Int. Cl.
*H04N 5/76* (2006.01)
*H04N 21/433* (2011.01)
(Continued)

(52) U.S. Cl.
CPC ......... *H04N 21/4334* (2013.01); *H04N 5/782* (2013.01); *H04N 21/235* (2013.01);
(Continued)

(58) Field of Classification Search
CPC ............... H04N 21/435; H04N 21/235; H04N 21/44016; H04N 21/8456;
(Continued)

(56) References Cited

U.S. PATENT DOCUMENTS

| 4,706,121 A | 11/1987 | Young |
| 5,293,357 A | 3/1994 | Hallenbeck |

(Continued)

FOREIGN PATENT DOCUMENTS

WO    20080129269 A1    10/2008

OTHER PUBLICATIONS

Mar. 28, 2018—Canadian Office Action—CA 2,746,408.
(Continued)

*Primary Examiner* — Robert Chevalier
(74) *Attorney, Agent, or Firm* — Banner & Witcoff, Ltd.

(57) ABSTRACT

Methods, computer readable media, and apparatuses for switching streams in response to detecting a start trigger are presented. A program's start trigger indicating that the program is upcoming may be detected on a first stream, and in response to detecting the start trigger on the first stream, a second stream containing the program may be switched to. The program may be a video program. Segment triggers may be detected and may be used to selectively record and/or delete segments of the program according to a priority scheme. Multiple start triggers may be detected at decreasing time intervals. The existence of a recording conflict may be determined based on a program's start trigger and a user may be alerted of the recording conflict.

25 Claims, 15 Drawing Sheets

Related U.S. Application Data continuation of application No. 13/558,752, filed on Jul. 26, 2012, now Pat. No. 8,971,693, which is a continuation of application No. 12/841,594, filed on Jul. 22, 2010, now Pat. No. 8,254,763.

(51) Int. Cl.

| | | |
|---|---|---|
| *H04N 21/235* | (2011.01) | |
| *H04N 21/435* | (2011.01) | |
| *H04N 21/45* | (2011.01) | |
| *H04N 21/472* | (2011.01) | |
| *H04N 21/845* | (2011.01) | |
| *H04N 5/782* | (2006.01) | |
| *H04N 21/858* | (2011.01) | |

(52) U.S. Cl.
CPC ....... *H04N 21/435* (2013.01); *H04N 21/4532* (2013.01); *H04N 21/47214* (2013.01); *H04N 21/8456* (2013.01); *H04N 21/858* (2013.01)

(58) Field of Classification Search
CPC ......... H04N 21/23424; H04N 21/4347; H04N 21/8455; H04N 21/44008; H04N 21/2365; H04N 5/232; H04N 21/8547; H04N 21/23608; H04N 21/812; H04N 21/8126; H04N 9/8205; H04N 21/858; G06F 3/04842; G06F 3/165
USPC ....... 386/296, 291, 297, 298, 292, 299, 323, 386/326
See application file for complete search history.

(56) References Cited

U.S. PATENT DOCUMENTS

| | | |
|---|---|---|
| 5,377,051 A | 12/1994 | Lane et al. |
| 5,541,738 A | 7/1996 | Mankovitz |
| 8,254,763 B2 | 8/2012 | Gilson |
| 2002/0120925 A1 | 8/2002 | Logan |
| 2003/0018980 A1* | 1/2003 | Gorbatov ............... H04N 5/782 725/133 |
| 2003/0066092 A1 | 4/2003 | Wagner et al. |
| 2004/0255336 A1 | 12/2004 | Logan et al. |
| 2007/0101367 A1 | 5/2007 | Lee et al. |
| 2007/0101394 A1 | 5/2007 | Fu et al. |
| 2008/0026790 A1 | 1/2008 | Nakao et al. |

OTHER PUBLICATIONS

Partial European Search Report—EP 11174621.0—dated Apr. 8, 2013.
Extended European Search Report—EP 11174621.0—dated Aug. 21, 2013.
European Office Action—EP App 11174621.0—dated Mar. 15, 2016.
Summons to European Oral Proceedings—EP Appl. 11174621.0—Nov. 25, 2016.
Canadian Office Action—CA App 2,746,408—dated Apr. 10, 2017.

* cited by examiner

PROGRAM GUIDE 750

| Channel | 9:00 P.M. | 9:30 P.M. | 10:00 P.M. | 10:30 P.M. |
|---|---|---|---|---|
| 2 | Private Practice 755→ | | College Football 760→ | |
| 3 | CSI: Miami | | The Mentalist | |
| 4 | The Office | 30 Rock | The Jay Leno Show | |
| 5 | Family Guy | Family Guy | Seinfeld | Seinfeld 765→ |

FIG. 9

PROGRAM GUIDE

| Channel | 9:00 P.M. | 9:30 P.M. | 10:00 P.M. | 10:30 P.M. |
|---|---|---|---|---|
| 2 | Private Practice | | College Football | |
| 3 | @SI Miami | | The Mentalist | |
| 4 | The Office | 30 Rock | The Jay Leno Show | |
| 5 | Family Guy | Family Guy | Seinfeld | Seinfeld |

FIG. 13

APPARATUS AND METHOD FOR RECORDING CONTENT

CROSS-REFERENCE TO RELATED APPLICATIONS

This application is a continuation of and claims priority to co-pending U.S. application Ser. No. 14/600,326, filed on Jan. 20, 2015 and entitled Apparatus and Method For Recording Content," which is a continuation of U.S. patent application Ser. No. 13/558,752, filed on Jul. 26, 2012 and entitled "Apparatus And Method For Recording Content" (now U.S. Pat. No. 8,971,693, issued Mar. 3, 2015), which is a continuation of U.S. patent application Ser. No. 12/841,594, filed on Jul. 22, 2010 and entitled "Apparatus And Method For Recording Content" (now U.S. Pat. No. 8,254,763, issued Aug. 28, 2012). The content of the above mentioned applications is incorporated herein by reference in its entirety.

BACKGROUND

The present disclosure relates generally to viewing and recording program content, such as television programs.

The introduction of the videocassette recorder (VCR) changed the consumption habits of content consumers by providing greater convenience and flexibility to the content consumers. The advent of the digital video recorder (DVR) has increased the amount of convenience and flexibility provided to content consumers.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to recording content. According to one or more aspects, a predetermined program's start trigger indicating that the predetermined program is upcoming may be detected by a device on a first stream received by the device. Subsequently, in response to detecting the predetermined program's start trigger on the first stream, the device may switch to receive a second stream carrying the predetermined program. The first stream may be a datastream carrying start triggers for a wide variety of programs that are upcoming, and may be used to signal a program's beginning for a plurality of receiving devices.

Some triggers may identify the beginning of a program, while other triggers may identify individual segments within a program. The triggers may allow users to custom tailor program recordings, such as setting a device to automatically record the opening monologue of a plurality of late-night talk shows. In some embodiments, segment triggers are placed in a separate stream from program start triggers.

In some embodiments, the program start triggers may be repeated on the first stream, and a program's trigger may appear more frequently as the program's start time approaches.

BRIEF DESCRIPTION OF THE DRAWINGS

The present disclosure is illustrated by way of example and not limited in the accompanying figures in which like reference numerals indicate similar elements and in which:

FIG. 9 illustrates a sample user interface in which one or more programs may be selected according to one or more aspects described herein.

FIG. 13 illustrates a sample user interface in which prioritized segments of one or more programs may be displayed according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
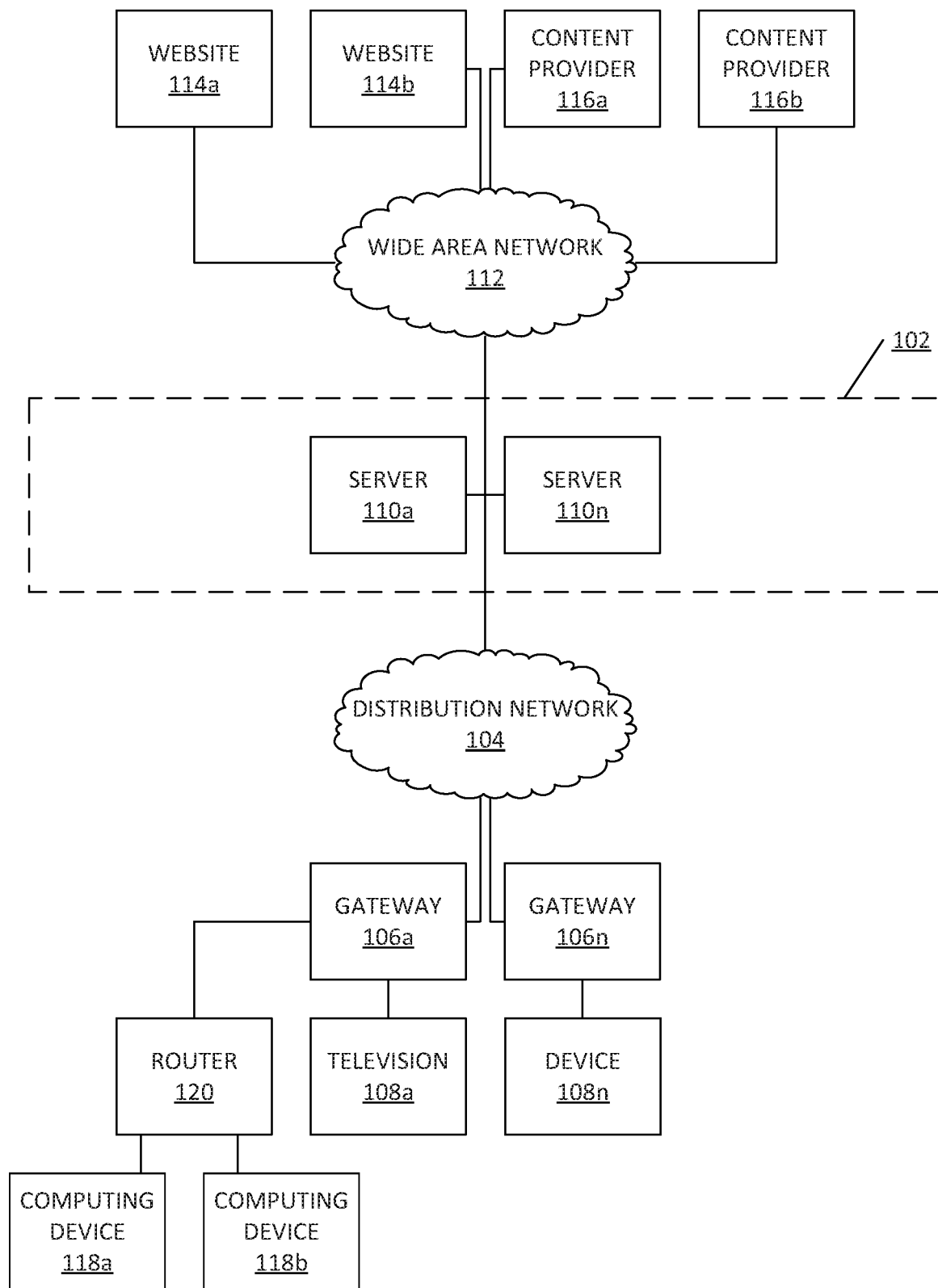
FIG. 1 illustrates an example network environment in which content may be distributed to users according to one or more aspects described herein.

FIG. 1 illustrates a content distribution system 100 that may be used in connection with one or more aspects described herein. The distribution system 100 may include one or more servers 102 that may be located at a control location. The server or processing location 102 may include a plurality of devices, such as servers 110a-110n, as well as other devices, including other data servers, computers, processors, security encryption and decryption apparatuses or systems, and the like. The server or processing location 102 may be operated by a content or service provider. In one or more configurations, one or more devices in the server or processing location 102 may comprise a Modem Termination System (MTS), for example, a Cable Modem Termination Server (CMTS), and such an MTS and/or CMTS may facilitate communication between the server or processing location 102 and one or more gateways 106a-106n, which also may be included in the distribution system 100, and which are further described below.

According to one or more aspects, the server or processing location 102 may be connected to one or more wired and/or wireless local and/or wide area networks. For example, the server or processing location 102 may be connected to wide area network 112, and wide area network 112 may be the Internet. Via wide area network 112, the server or processing location 102 may be able to access one or more websites, such as website 114a and website 114b, and/or the server or processing location 102 may be able to access one or more content providers, such as content provider 116a and content provider 116b.

According to one or more additional aspects, the distribution system 100 further may include a distribution network 104. Distribution network 104 may include one or more transmission lines, such as wireless, coaxial cable, optical, and/or other types of transmission lines or combinations thereof, which may facilitate communication between the server or processing location 102 and the one or more gateways 106a-106n.

The distribution system 100 further may include one or more gateways 106a-106n and one or more corresponding consumption devices 108a-108n. Gateways 106a-106n each may include a general computing device that is configured to receive content from the server or processing location 102, and such content may include data, such as Internet Protocol data, video content, such as television programming, and/or any other type of content. In one or more configurations, gateways 106a-106n may include one or more modems, optical interface devices, set-top boxes (STBs), and/or digital video recorders (DVRs), for example. Thus, the distribution system 100 may be used, in one aspect, as a media service provider/user system in which a provider and/or vendor generally operates the server or processing location 102 and/or the distribution network 104, and which the provider and/or vendor generally also provides a user (e.g., a subscriber, client, customer, service user, etc.) with one or more gateways 106a-106n.

One or more gateways 106a-106n may be placed at a user location such as a user's home, a tavern, a hotel room, a business, etc., and one or more consumption devices 108a-108n may be provided to or by the user. The consumption device 108a may include a television, high definition television (HDTV), monitor, host viewing device, a portable wireless device, such as a smart phone, MP3 player, audio receiver, radio, communication device, personal computer, media player, digital video recorder, game playing device, or the like. Additionally or alternatively, the consumption device 108a may be implemented as a transceiver having interactive capability in connection with gateway 106a and/or the server or processing location 102.

According to one or more aspects, distribution network 104 further may provide a user with access to a wide area network, such as wide area network 112. For example, via distribution network 104, a user using a device, such as computing device 118a and/or computing device 118b, may be able to access website 114a, website 114b, content provider 116a, and/or content provider 116b. Additionally or alternatively, content received at gateway 106a may be supplemented and/or customized by data obtained via wide area network 112. In one or more configurations, a router 120 may be configured to route data from a gateway, such as gateway 106a, to a computing device, such as computing device 118a. In one or more additional configurations, gateway 106a may perform such routing, and computing device 118a and/or computing device 118b may be connected directly to gateway 106a.

Figure 2:
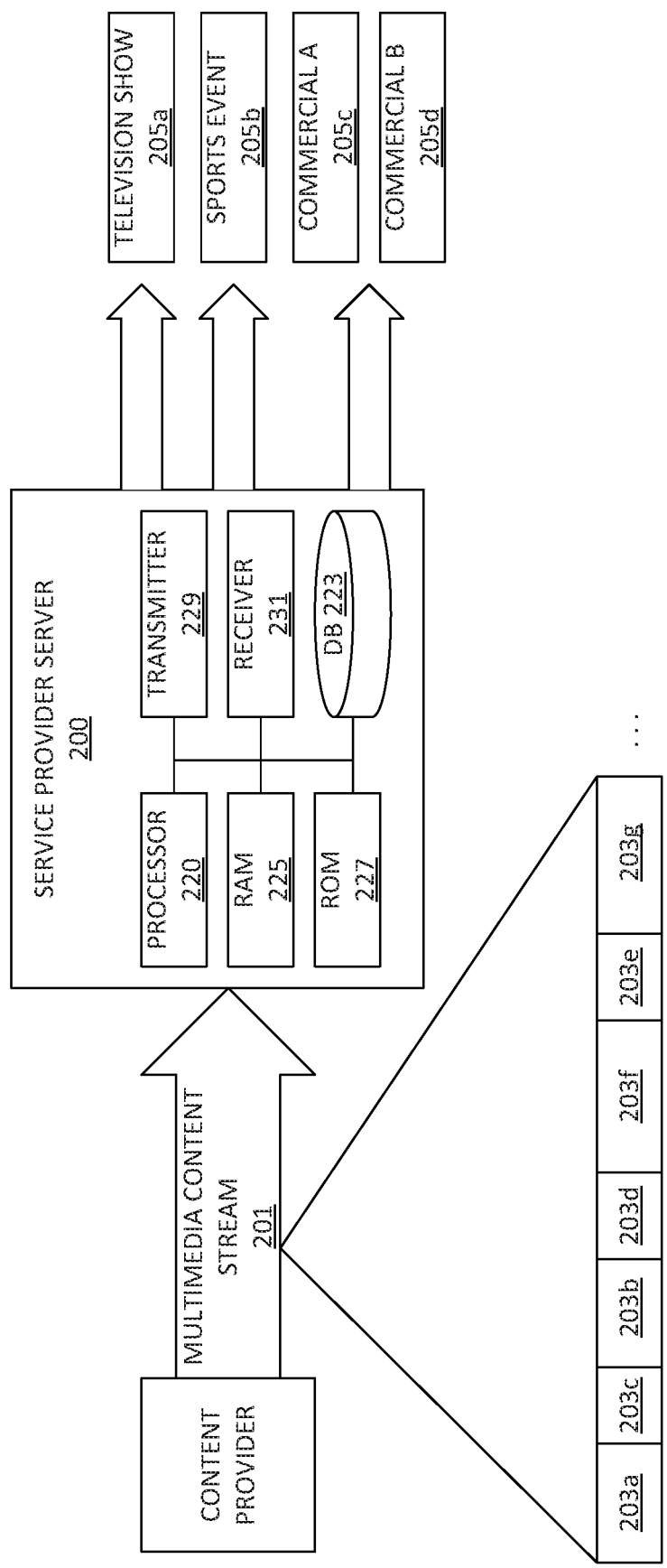
FIG. 2 illustrates an example content stream according to one or more aspects described herein.

FIG. 2 illustrates a content stream that may be received from a content provider (e.g., a television broadcast company, a movie studio, a web site or service, an audio source, etc.) at a service provider server 200 (e.g., server or processing location 102) according to one or more aspects described herein. Linear multimedia content stream 201 may include a plurality of programming segments 203a-203g. Each segment may correspond to some or all of a particular program or content item, including television shows, movies, commercials, sporting events, news reports, public service announcements, and the like. In multimedia content stream 201, for example, segments 203a and 203b may correspond to television show 205a, segments 203c, 203d, and 203e may comprise commercial programming, and segments 203f and 203g may correspond to a sporting event 205b. Segments 203c, 203d, and 203e may, for example, correspond to the same commercial 205c repeated over time or may comprise multiple different commercials (e.g., 205c and 205d). Segments 203 also may be Internet Protocol data packets, and/or data packets according to any other communication protocol.

Server 200 may include various computing components including processor 220, database 223, RAM 225, ROM 227, transmitter 229, and receiver 231 to provide various functionalities. For example, processor 220 may be used to perform mathematical functions and execute instructions stored in RAM 225 and/or ROM 227. Processor 220 may include a single processor, multiple processing cores, and/or multiple processors. For example, processor 220 may include a central processing unit (CPU) in addition to a graphics processing unit (GPU). The separate graphics processing unit may be used to aid image analysis operations and the like. In addition to video-on-demand assets, database 223 may store content metadata, user information, network configuration information, content provider information, and the like. Transmitter 229 and receiver 231 may be configured to transmit content and receive content, respectively. For example, transmitter 229 may be configured to transmit content data to users in a distribution network (e.g., network 104 of FIG. 1), and receiver 231 may be configured to receive content from content providers, such as television broadcasters. According to one or more additional aspects, all of the various devices and components described herein may be implemented with similar hardware and/or software components.

Figure 3:
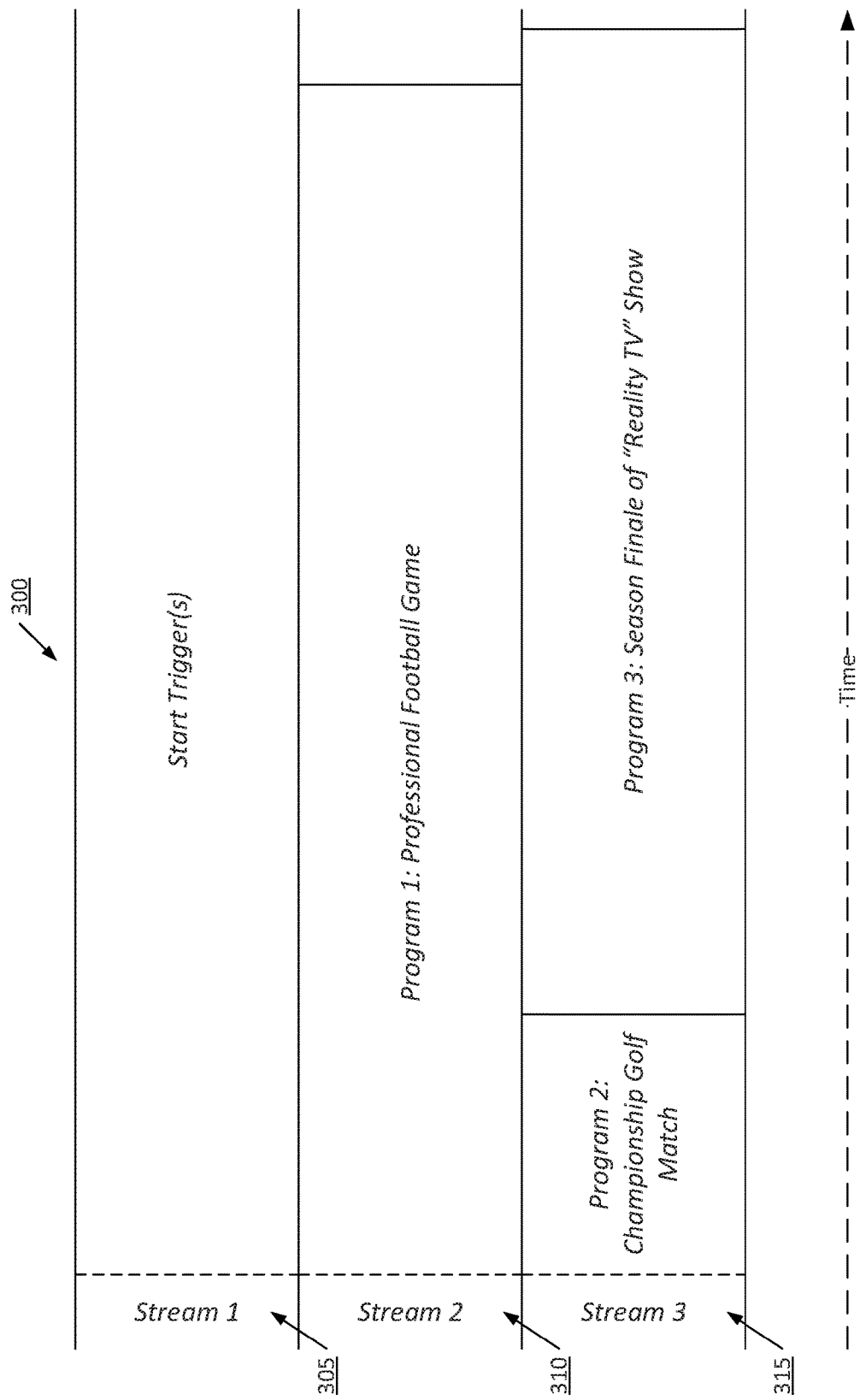
FIG. 3 illustrates a plurality of streams sent according to one or more aspects described herein.

FIG. 3 illustrates a plurality of streams sent according to one or more aspects described herein. Signal 300 may contain one or more streams, such as stream 305, stream 310, and stream 315. One or more of the streams in signal 300 may be analog and/or digital channels, MPEG (Moving Picture Experts Group) audio and/or video data streams, IP (Internet Protocol) data streams, and/or any other type of data transport mechanism. In addition, at least one stream in signal 300 may be contained in out-of-band signaling, such that a receiving device (e.g., gateway 106a) might not need to keep its video tuner tuned to the at least one stream to receive information from that at least one stream. For example, stream 305 may be contained in out-of-band signaling, such that gateway 106a may use a separate, out-of-band tuner (or any type of a receiver) to receive updated information on the out-of-band stream 305 (e.g., one or more start triggers, as further described below), and continue using its in-band tuner to receive content for the user. In at least one arrangement, stream 305 also may include content, such as video programming, in addition to the triggers. According to one or more aspects, stream 305 may contain one or more start triggers, and each start trigger may indicate that certain data is available, for example, that one or more predetermined programs are upcoming. For example, stream 305 may contain a start trigger indicating that a program is upcoming, and the start trigger may include a name and/or identification value for the program, a scheduled start time for the program, and/or a value indicating the time remaining until the scheduled start time of the program. Additionally or alternatively, stream 305 may contain a start trigger indicating that one or more segments and/or regions of a program is upcoming, and such a start trigger may include similar information (e.g., a name and/or identification value for the program and/or the segment or region of the program, a scheduled start time for the program and/or the segment or region of the program, and/or a value indicating the time remaining until the scheduled start time of the program and/or the segment or region of the program). According to at least one aspect, the start trigger in this example additionally may include a stream identifier, and the stream identifier may indicate on which stream the program may be upcoming. For example, a stream identifier of a start trigger in stream 305 may indicate that a program is upcoming on another stream, such as stream 310 and/or stream 315. A program may be determined to be upcoming when its anticipated start time (which may be adjusted due to changes in programming) is within a predetermined time interval, such as a program starting within 2 hours (or whichever time period is determined to be close enough to be affected by a delay of a prior live event). Such a time period may be determined and/or set by the service provider, a content provider, the user, and/or any combination thereof. Additionally or alternatively, a plurality of start triggers could be transmitted repeatedly in a particular stream (e.g., stream 305) for all programs that are upcoming or data that becomes available. In an order and frequency further discussed below, for example, a recording device may tune to a particular stream and/or obtain updated information regarding the scheduled start time of one or more of the programs that are upcoming.

Additionally or alternatively, streams 310 and 315 each may contain one or more programs, and each program may have one or more corresponding start triggers contained in stream 305. For example, stream 310 may contain a professional football game, and stream 315 may contain a championship golf match and subsequently may contain the season finale of a "reality TV" program. In this example, insofar as streams 310 and 315 may represent linear content streams, streams 310 and 315 thus may include linear programming for which one or more corresponding start triggers may be provided in stream 305.

According to at least one aspect, the one or more start triggers contained in stream 305 may enable a user and/or a computer to account for a change in programming (e.g., a start time being pushed back as a result of a live event running long or another delay). For example, if the championship golf match contained in stream 315 runs later than originally expected (e.g., because there is a tie-breaking playoff to conclude the match) and thus delays the start time of the season finale of the "reality TV" program (which originally may have been scheduled to begin at a certain time based on the assumption that the championship golf match would have concluded by that certain time), then the one or more start triggers contained in stream 305 that correspond to the season finale of the "reality TV" program contained in stream 310 may change and/or reflect the delayed and/or updated start time of the "reality TV" program contained in stream 310. In other words, the one or more start triggers contained in stream 305 may be updated in real-time to reflect the changed start times of one or more programs contained in one or more other streams. Such updating can be performed manually, or it can be automatically performed based on coded information identifying the progress of the golf match. For example, a signal may identify the hole that the last golfer is playing, and the system can automatically adjust the golf match's anticipated end time based on the number of holes remaining.

According to another aspect, the one or more start triggers contained in stream 305 may enable a user and/or a computer to receive and/or record a desired program despite the starting time of the desired program being delayed from its originally scheduled starting time. One or more of the various devices described herein (e.g., gateway 106a) may tune to and/or decode at least one stream containing one or more start triggers to determine when a scheduled program is to begin and/or to determine whether a scheduled program has been delayed. For example, a user may have planned on watching the professional football game in stream 310 until the start time of the season finale of the "reality TV" program in stream 315. Rather than periodically switching to stream 315 to determine whether the championship golf match has concluded, the user may simply receive and/or be advised of the updated start time of the season finale of the "reality TV" program via one or more start triggers corresponding to the "reality TV" program and contained in stream 305. Additionally or alternatively, a segment alert may be displayed to advise the user of the start of a particular segment of a program, as further described below.

In another example, a device may be scheduled to record the season finale of the "reality TV" program in stream 315. Rather than merely beginning a recording operation at a particular time (i.e., the particular time at which the season finale of the "reality TV" program originally was scheduled to begin), the device may begin a recording operation at the updated start time of the "reality TV" program after receiving the updated start time of the "reality TV" program via one or more start triggers corresponding to the "reality TV" program and contained in stream 305. In other words, the one or more start triggers contained in stream 305 may enable a system to adjust dynamically to changes in programming and/or program scheduling.

In one or more arrangements, various functions described herein may be provided by repeatedly transmitting, on a trigger data stream, one or more updated start triggers for programs. For example, an updated set of start triggers for a set of upcoming programs may be transmitted repeatedly at a predefined interval (e.g., every two minutes). In at least one additional arrangement, an updated set of start triggers for a set of upcoming programs may be transmitted in a countdown manner. For example, an updated set of start triggers may be transmitted at an increasing frequency as the start time of one or more upcoming programs approaches, as further described below.

Figure 4:
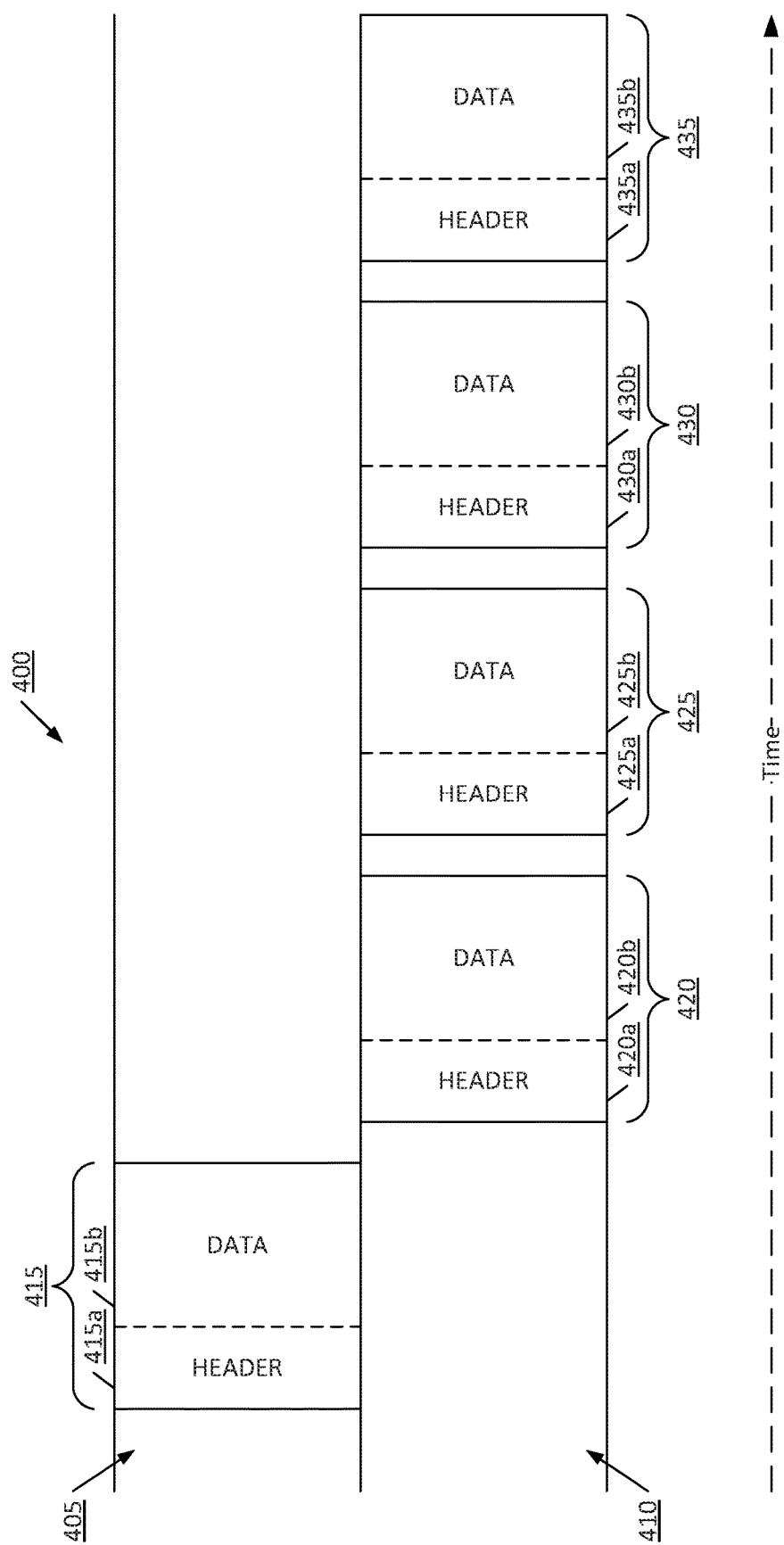
FIG. 4 illustrates a plurality of data packets in a plurality of streams sent in a signal according to one or more aspects described herein.

FIG. 4 illustrates a plurality of data packets in a plurality of streams sent in a signal according to one or more aspects described herein. Signal 400 may contain one or more streams, such as stream 405 and stream 410. Stream 405 and stream 410 may contain one or more packets, such as packet 415, packet 420, packet 425, packet 430, and/or packet 435. Each packet may contain one or more portions, such as header portion 415a and data portion 415b of packet 415.

According to one or more aspects, a packet in one stream, such as packet 415 in stream 405, may contain one or more start triggers for one or more programs, which may be contained in one or more packets in another stream, such as packets 420, 425, 430, and 435 in stream 410. Thus, one or more packets may be used in implementing one or more of the aspects described above. For example, a start trigger indicating that a first program is upcoming may be contained in the header portion 415*a* and/or in the data portion 415*b* of packet 415 in stream 405. Further, in this example, the first program may be contained in one or more packets in stream 410, such as packets 420, 425, 430, and/or 435.

Figure 5:
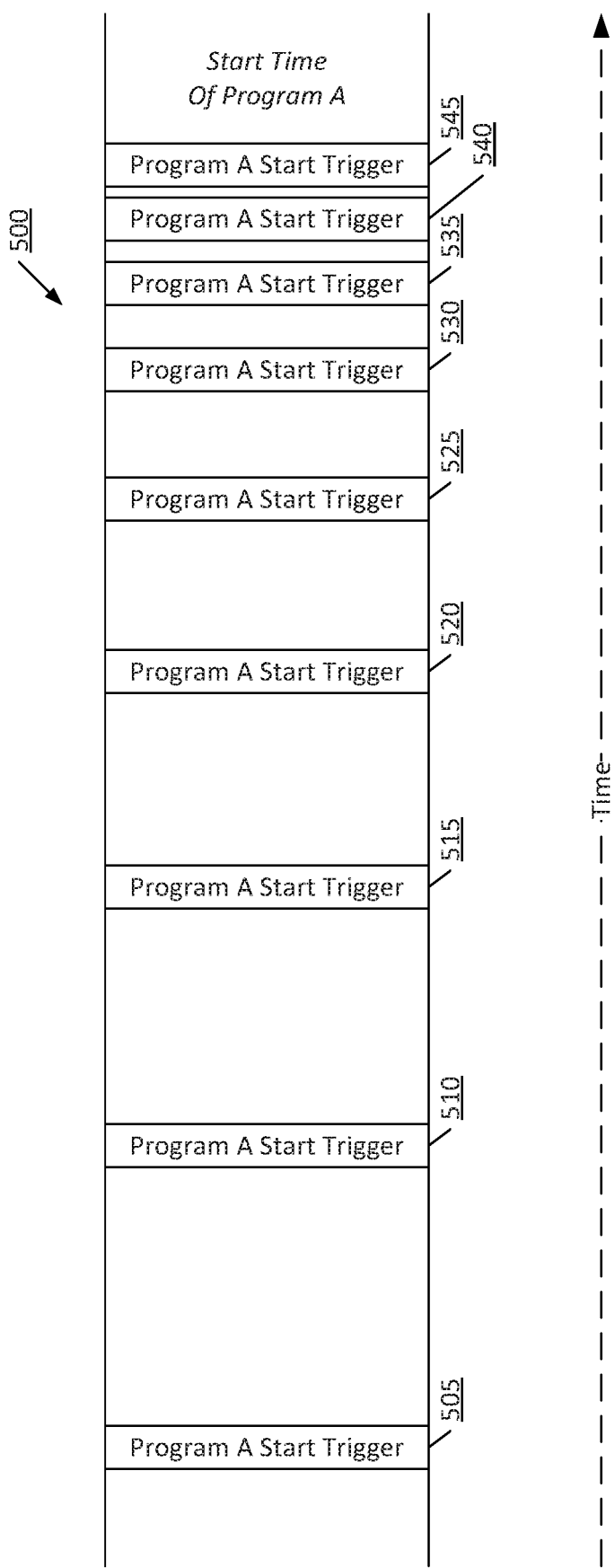
FIG. 5 illustrates a plurality of program start triggers in a stream of a signal according to one or more aspects described herein.

FIG. 5 illustrates a plurality of program start triggers in a stream of a signal according to one or more aspects described herein. According to one or more aspects, a stream (e.g., stream 500) may contain a plurality of start triggers where the start triggers are transmitted and/or detected repeatedly for some or all of the programs that are upcoming. For example, a server (e.g., server or processing location 102) may transmit, in a signal, a plurality of start triggers in succession, and the time interval between start triggers may be a predefined duration (e.g., 120 seconds).

Additionally or alternatively, because a start trigger may become more relevant and/or significant as the start time of program that it corresponds to approaches, it may conserve bandwidth to transmit and/or detect a start trigger less often when the start time of the program is further away than when the start time of the program is closer and/or approaching. Thus, in at least one additional arrangement, the successive start triggers may be transmitted and/or detected at decreasing time intervals as time elapses. In other words, in at least one aspect, the successive start triggers may be transmitted and/or detected at increasing frequency as the start time of the particular program approaches. For example, as seen in FIG. 5, as the start time of example program A approaches, the start triggers indicating the start time of example program A (e.g., start triggers 505, 510, 515, 520, 525, 530, 535, 540, and 545) may be transmitted and/or detected at increasing frequency. A program anticipated to start in 2 hours might have a trigger appearing once every 10 minutes, while a program that is anticipated to start in 15 minutes might have a trigger appearing every 10 seconds. Such an arrangement may make optimal use of available bandwidth of a stream that may be dedicated to carrying start triggers.

Figure 6:
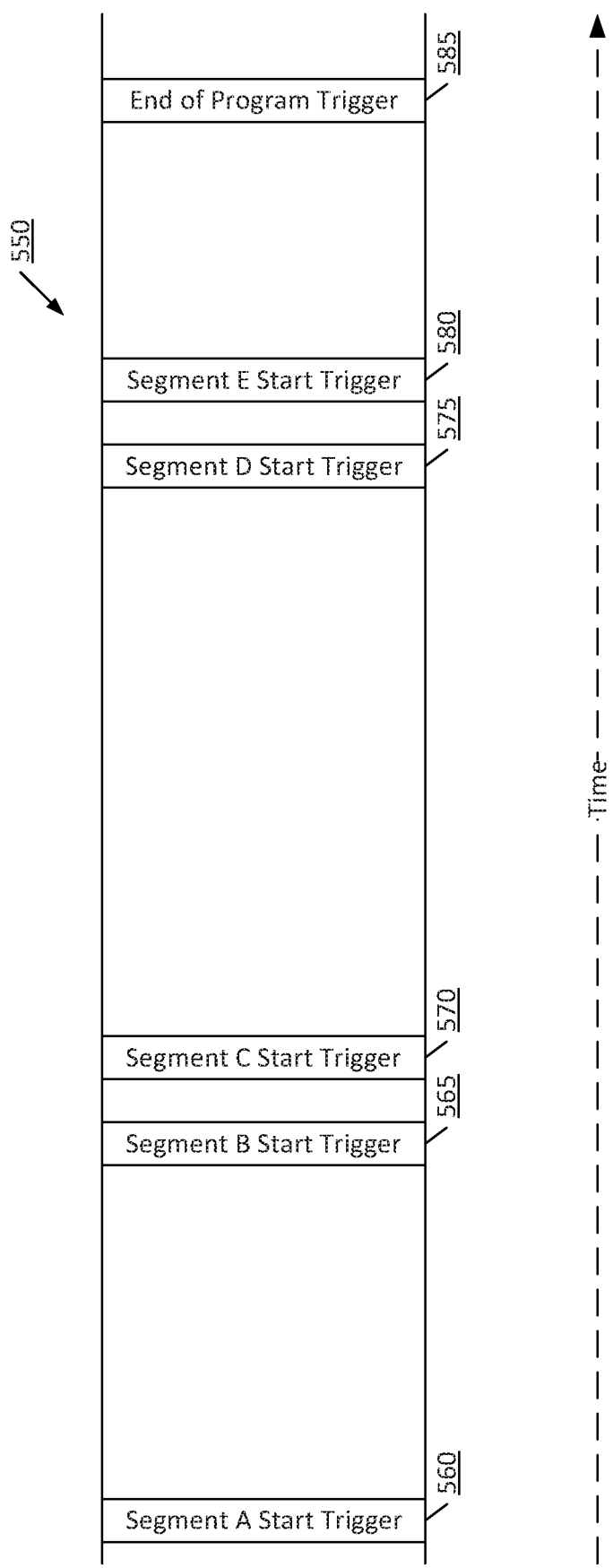
FIG. 6 illustrates a plurality of segment triggers in a stream of a signal according to one or more aspects described herein.

FIG. 6 illustrates a plurality of segment triggers in a stream of a signal according to one or more aspects described herein. The stream containing the segment triggers may be a different stream from the one carrying the program start triggers, and may be embedded within a stream carrying the signals for the program itself (e.g., embedded in the video stream for a talk show). According to one or more aspects, a segment trigger may identify a particular segment of a program and further may indicate when the particular segment of the program is scheduled to begin. Additionally or alternatively, a segment trigger may further identify the program containing the particular segment. For example, a segment trigger may be transmitted in a stream of a signal in the form of a code, and the segment trigger may identify the current program (e.g., "The Jay Leno Show"), may identify a current and/or an upcoming segment of the current program (e.g., "Opening Monologue," "Guest 1", etc.), and may indicate a scheduled start time for the identified segment (e.g., "6.012 seconds" or "22:00:00.12").

Thus, in one or more arrangements, a stream (e.g., stream 550) may contain a plurality of segment triggers (e.g., segment triggers 560, 565, 570, 575, and 580). Stream 550 further may contain an end of program trigger 585, which may be included to indicate when a particular program is scheduled to end. A server (e.g., server or processing location 102) transmitting stream 550 may transmit a segment trigger in advance of a corresponding segment and/or simultaneously with the start of the corresponding segment. A device configured to receive the segment triggers, such as gateway 106*a*, then may use the received segment triggers in selectively recording and/or displaying one or more segments of a program, as further described below. A single stream or separate streams may contain segment triggers and/or start triggers.

According to at least one aspect, a packet may contain one or more segment triggers, and each segment trigger may correspond to one or more segments of a particular program. More specifically, a segment trigger (e.g., segment trigger 560) may be contained in a header portion of a packet that also contains some or all of the program in its data portion. For example, referring back to FIG. 4, packets 420, 425, 430, and 435 in stream 410 may contain both segments of a program and segment triggers corresponding to each of the segments. In this example, the segments of the program (and/or the one or more parts of each segment) may be contained in the data portion of each packet (e.g., data portion 420*b* of packet 420, data portion 425*b* of packet 425, data portion 430*b* of packet 430, and data portion 435*b* of packet 435), and the corresponding segment triggers may be contained in the header portion of each packet (e.g., header portion 420*a* of packet 420, header portion 425*a* of packet 425, header portion 430*a* of packet 430, and header portion 435*a* of packet 435).

According to one or more aspects, the one or more segment triggers included in stream 550 may enable a device and/or a user to selectively record and/or display one or more segments of a program. For instance, a device (e.g., gateway 106*a*) implementing one or more aspects of the disclosure may use segment triggers in determining the start times and/or stop times of segments of a program. Such a device thus may be able to record, or cause another device to record, content segments of the program while skipping over (e.g., selectively not recording) commercial segments associated with the program. For example, such a device may be able to record a first segment of a program (e.g., the actual program, as opposed to commercials), stop recording precisely at the last frame of the first segment, and resume recording precisely at the first frame of a second segment of the program (e.g., the next segment of the program, after a commercial break).

A football game can be a good example of the versatility of these features. For instance, segment triggers may be used to identify portions of the game, such as team possessing the ball, the time in the game, the score, individual plays, the position on the field, scoring a touchdown, scoring a field goal, scoring a safety, blocking a kick or punt, etc. One trigger might indicate that the offense has the ball inside the twenty yard line (in the 'red zone'). A user could set his/her device to automatically record any football game having that trigger, resulting in the user having a recording of a days' worth of red zone football plays, spanning all games. If the device was buffering the game anyway, then this recording may simply result in the copying of the red zone segments into a separate file in the record portion of a device (e.g., digital video recorder—DVR) memory. Additionally, having the buffered segments allows the device to go back in time, transferring selected buffered segments to a record file as well. The user could set the device to not only record all of the red zone segments live as they occur, but to also go back in time and record the 4 plays leading up to the red zone segment, by transferring those additional segments from the buffer to the record memory file as well. Although football is discussed in the example above, similar treatment can be used for other types of programming. In another instance, with respect to a game show program in which contestants sing, the device may be configured to record only the segments of the program in which the contestants are singing, while skipping over the other segments of the program (e.g., segments in which a game show judge is commenting on a contestant's performance, segments in which a game show host is introducing the contestants, etc.).

Figure 7:
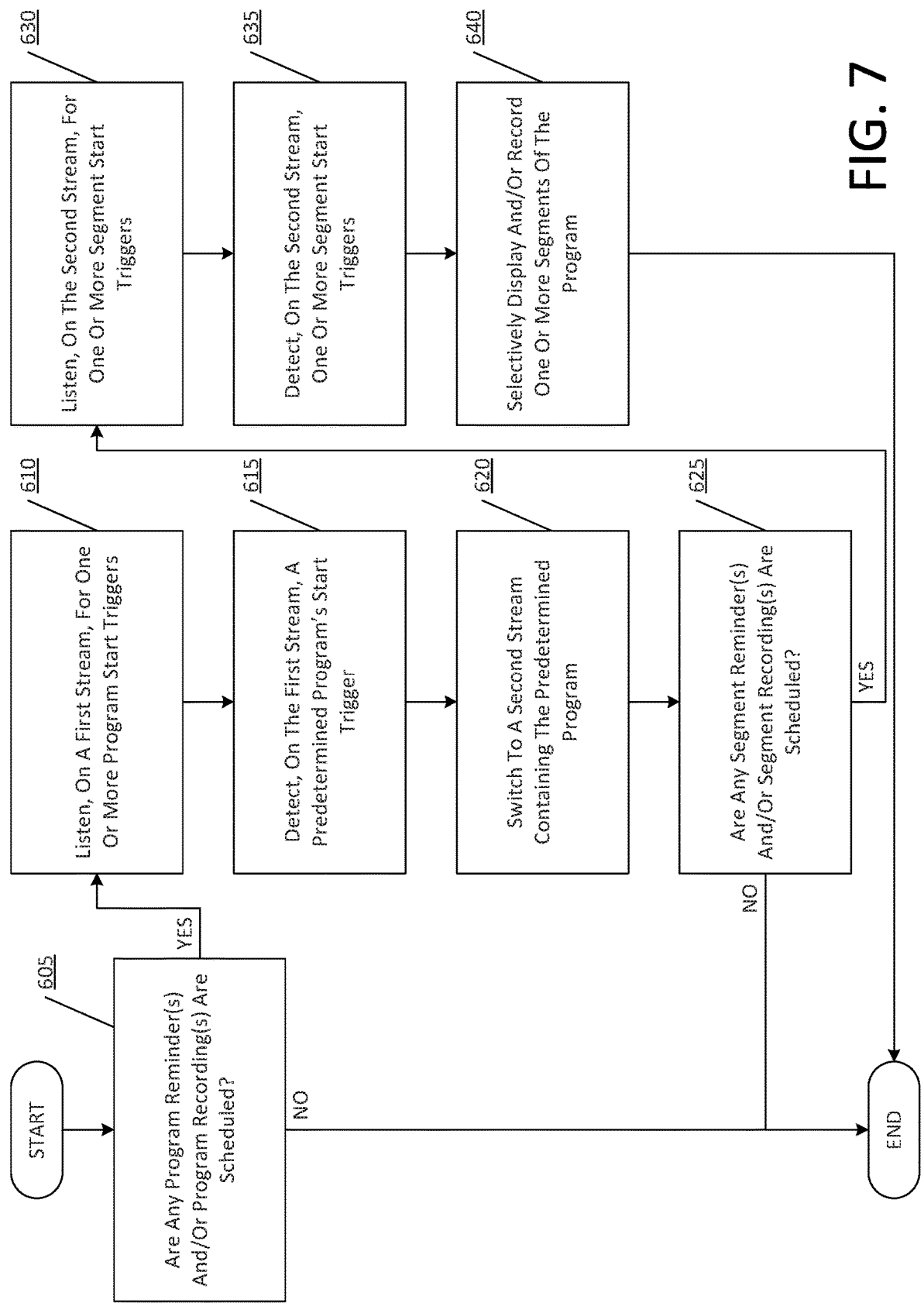
FIG. 7 illustrates a method of switching streams in response to detecting a start trigger according to one or more aspects described herein.

FIG. 7 illustrates a method of switching streams (if necessary) in response to detecting a start trigger according to one or more aspects described herein. According to one or more aspects, the method illustrated in FIG. 7 may be performed by a device, such as gateway 106a.

In step 605, it may be determined whether one or more program reminders are scheduled and/or whether one or more program recordings are scheduled. For example, a device (e.g., gateway 106a) may store in memory predefined settings and/or user preferences that indicate whether a user preference, a program reminder, and/or a program recording are scheduled, and these stored settings and/or preferences may be retrieved from the device's memory. According to one or more aspects, a user may adjust these settings and/or preferences using one or more of the user interfaces described below.

In step 610, if at least one user preference, program reminder, or program recording is scheduled, one or more program start triggers may be listened for or detected on a first stream of a received signal. For example, a device (e.g., gateway 106a) may listen to a first stream of a received signal for one or more program start triggers. Such a device may listen for or detect program start triggers on the first stream of the received signal continuously or at predefined variable and/or fixed intervals, as described above, for example. Additionally or alternatively, if there is not at least one program reminder or program recording scheduled, such a device (e.g., gateway 106a) might not listen for program start triggers and the method may end.

In step 615, a predetermined program's start trigger may be detected on the first stream of the received signal. For example, a predetermined program's start trigger may be detected on a first stream of a received signal, as described with respect to FIGS. 3-5 above, by a gateway 106a. According to one or more aspects, a start trigger indicating that a program is upcoming may be detected on a first stream, and the start trigger further may indicate that the upcoming program will be and/or is contained in a second stream.

In step 620, a second stream of the received signal containing the predetermined program may be switched to, if the program is contained in a separate stream. For example, in response to detecting the predetermined program's start trigger on the first stream of the received signal, where the start trigger indicates that the predetermined program will be and/or is contained in a second stream of the received signal, the gateway 106a (or another device such as a display device, a tuner, or a set top box, for example) may switch at least one of one or more tuners with which the gateway 106a may be equipped to the second stream. This switching may cause the predetermined program to be played back and/or recorded by the gateway 106a and/or one or more other devices, such as a video monitor connected to or part of the gateway 106a.

In step 625, it may be determined whether one or more segment reminders are scheduled and/or whether one or more segment recordings are scheduled. For example, a device (e.g., gateway 106a) may store in memory predefined settings and/or user preferences that indicate whether a segment reminder and/or a segment recording are scheduled, and these stored settings and/or preferences may be retrieved from the device's memory. According to one or more aspects, a user may adjust these settings and/or preferences using one or more of the user interfaces described below.

In step 630, if at least one segment reminder or segment recording is scheduled, one or more segment triggers may be listened for on the second stream or the first stream of the received signal. For example, a device (e.g., gateway 106a) may listen to the second stream or the first stream of the received signal for one or more segment triggers while simultaneously processing data on the second stream corresponding to the current program, as further described above. Additionally or alternatively, if there is not at least one segment reminder or segment recording scheduled, the device (e.g., gateway 106a) might not listen for segment triggers and the method may end.

In step 635, one or more segment triggers may be detected on the second stream or the first stream. For example, one or more segment triggers may be detected by a gateway 106a, as described above. In response to detecting the one or more segment triggers on the second stream, gateway 106a may implement one or more segment manipulation functions, as further described below. For example, gateway 106a may cause to be displayed a user interface comprising a segment prioritization menu, as further described with respect to FIGS. 10-12 below, a program guide with segment information, as further described with respect to FIG. 13 below, a segment alert, as further described with respect to FIG. 14 below, and/or a segment playback menu, as further described with respect to FIG. 15 below.

In step 640, one or more segments of the program may be selectively displayed and/or recorded. For example, gateway 106a or another device may be configured to selectively record or cause another device to record one or more segments of a program and/or a genre of programs, as further described with respect to FIGS. 10-12 below, and having detected one or more segment triggers in step 615, gateway 106a may selectively record one or more segments of the program.

Figure 8:
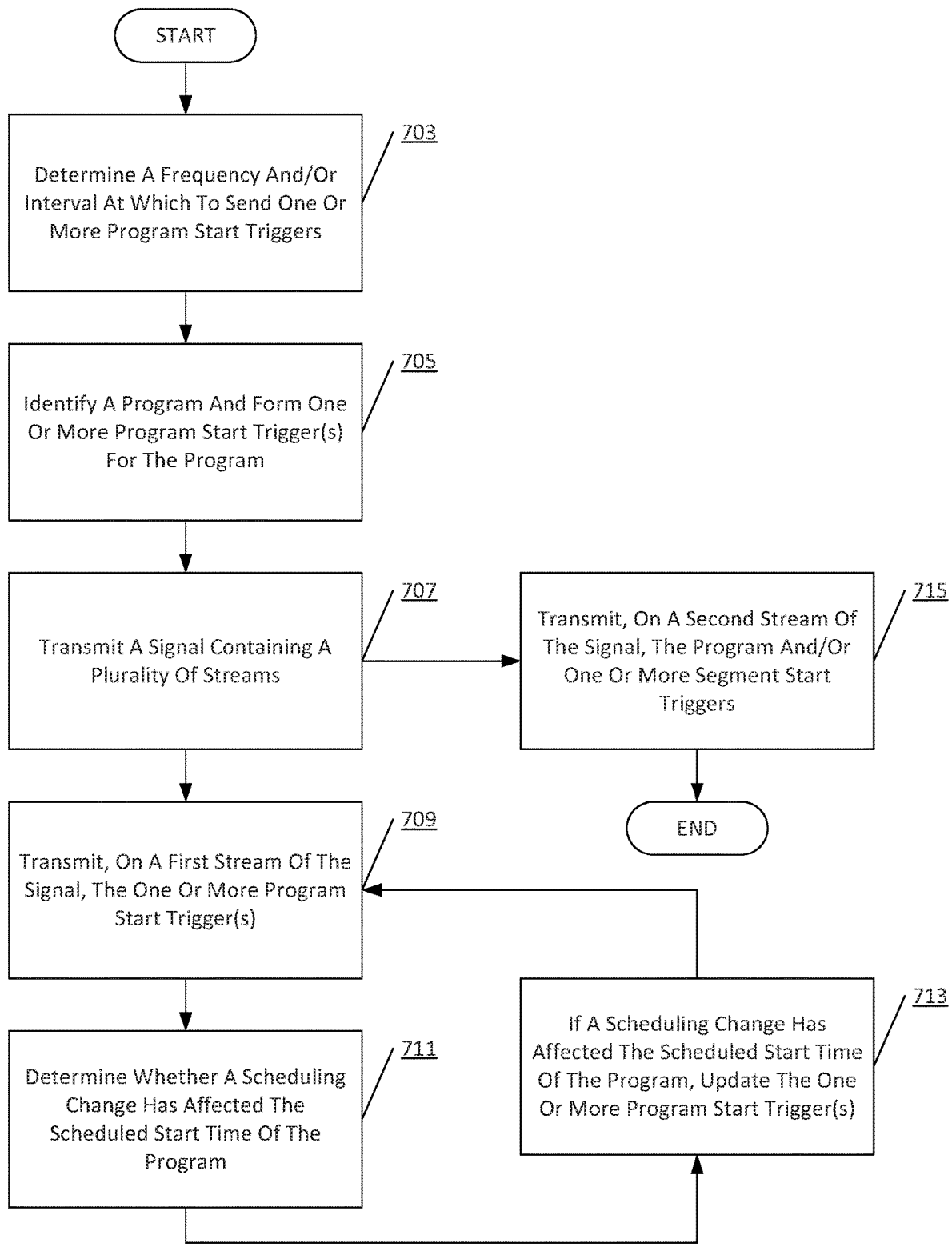
FIG. 8 illustrates a method of transmitting a plurality of streams according to one or more aspects described herein.

FIG. 8 illustrates a method of transmitting a plurality of streams according to one or more aspects described herein. According to one or more aspects, the method illustrated in FIG. 8 may be performed by a computing device, such as a server or processing location 102.

In step 703, a frequency and/or interval at which to send one or more program start triggers or segment triggers may be determined. For example, a server (e.g., server or processing location 102) may determine a frequency and/or interval at which to send start triggers based on predefined settings (e.g., indicating that triggers should begin appearing in the program start trigger stream when the program is an hour away from an anticipated start). Additionally or alternatively, such a server may determine that a set of start triggers for a set of upcoming programs is to be transmitted repeatedly at a fixed interval (e.g., every two minutes) and/or at a variable interval (e.g., at increasing frequency as the start times of the various upcoming programs approach).

In step 705, a program may be identified and one or more start triggers may be formed for the program. For example, a server (e.g., server or processing location 102) may select an upcoming program from a set of programs and determine when one or more corresponding start triggers should be transmitted based on the current time, the scheduled start time of the upcoming program, the scheduled start and end times of one or more programs preceding the upcoming program, the genre and nature of the one or more programs preceding the upcoming program (e.g., live programming vs. prerecorded programming), and/or the like. In at least one arrangement, a server may determine that start triggers are to be sent at a relatively high frequency for a first program because a program preceding the first program is a live program that might run long (e.g., a live sporting event). On the other hand, a server may determine that start triggers are to be sent at a relatively low frequency for a second program because a program preceding the second program is a prerecorded program that likely will end at a scheduled time.

In step 707, a signal containing a plurality of streams may be transmitted. For example, a server (e.g., server or processing location 102) may transmit a signal having a plurality of streams.

In step 709, which may be performed simultaneously with step 715, one or more program start triggers may be transmitted on a first stream of the signal. For example, the server (e.g., server or processing location 102) may transmit a start trigger on a first stream for a program which may be transmitted on a second stream. In this example, the server may transmit additional start triggers for the program at a frequency and/or interval determined in step 703.

In step 711, it may be determined whether a scheduling change has affected the scheduled start time of a program. For example, the server (e.g., server or processing location 102) may determine whether a program is to start earlier or later than scheduled based on current programming, user input, or the like. The server may determine automatically that a program is to start later than scheduled, for example, if the server is transmitting a series of prerecorded programs of known lengths, and it determines, based on the lengths of these preceding programs, that a later-scheduled program will not begin on time. Additionally or alternatively, the server may determine that a program is to start later than scheduled, for example, because a user or operator may provide input to the server indicating that a later-scheduled program will not begin on time.

In step 713, the one or more program start triggers may be updated if a scheduling change has affected the scheduled start time of a program, and the method may loop back to step 709. For example, the server (e.g., server or processing location 102) may update the one or more program start triggers based on the results of the determining in step 711, and subsequently may transmit the updated program start triggers by looping back to step 709. In at least one arrangement, once the program begins, the method may end. Additionally or alternatively, the server may transmit the updated program start triggers at a frequency and/or interval determined in step 703.

In step 715, the program and/or one or more segment start triggers may be transmitted on a second data stream. For example, the server (e.g., server or processing location 102) may transmit the program and its corresponding segment triggers on a second stream, different from a stream carrying the start triggers. According to one or more aspects, the segment triggers for a particular program may be predefined by a user, operator, and/or content provider. In at least one additional arrangement, however, the server may generate and transmit one or more segment triggers for a particular program automatically. For example, the server may generate segment triggers for a program based on known information about the different elements of the content being transmitted on the second stream. Thus, the server may generate a segment trigger identifying a commercial break in the particular program based on the server's knowledge that it is about to transmit a commercial. In another example, the server may generate a segment trigger identifying a return from a commercial break in the particular program based on the server's knowledge that it is about transmit a segment of the particular program. Once the server has finished transmitting the program, the method may end.

FIG. 9 illustrates a sample user interface in which one or more programs may be selected according to one or more aspects described herein. User interface 750 may include one or more program listings, such as program listings 755, 760, and 765. In one or more configurations, a user may select a program to record by selecting one or more of the program listings in user interface 750. Additionally or alternatively, a user may select a program for segment prioritization, as further described below, by selecting one or more of the program listings in user interface 750.

Figure 10:
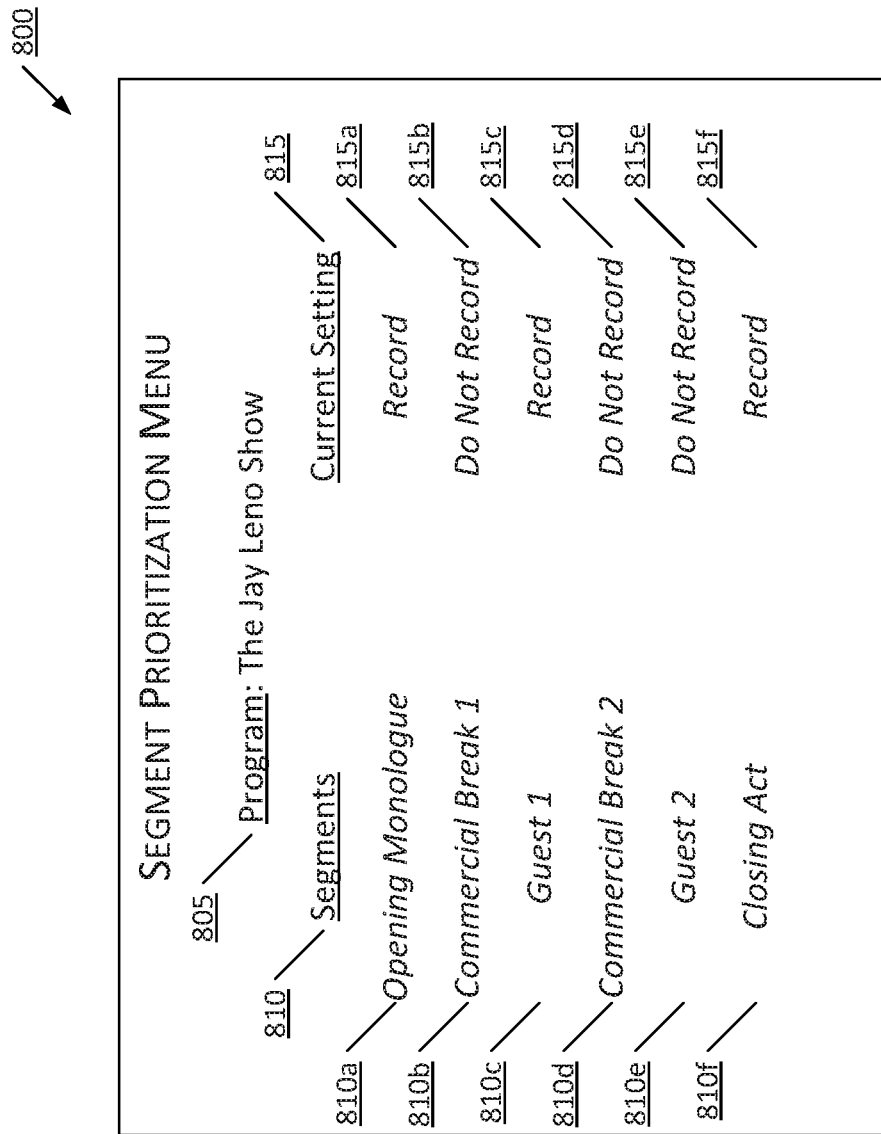
FIG. 10 illustrates a sample user interface in which one or more segments of a program may be prioritized according to one or more aspects described herein.

FIG. 10 illustrates a sample user interface in which one or more segments of a program may be prioritized according to one or more aspects described herein. User interface 800 may include a program identifier 805, a segment listing 810, and a current setting listing 815.

In one or more configurations, segment listing 810 may list one or more segments, such as segment 810a, segment 810b, segment 810c, segment 810d, segment 810e, and segment 810f. Current setting listing 815 may list one or more current settings, such as current setting 815a, current setting 815b, current setting 815c, current setting 815d, current setting 815e, and current setting 815f, and each of the current settings in current setting listing 815 may correspond to a segment in segment listing 810. Thus, for example, current setting 815a may correspond to segment 810a, current setting 815b may correspond to segment 810b, current setting 815c may correspond to segment 810c, current setting 815d may correspond to segment 810d, current setting 815e may correspond to segment 810e, and current setting 815f may correspond to segment 810f. Each current setting in current setting listing 815 may control whether its corresponding segment is to be recorded, and each current setting may be stored in the memory of a device (e.g., in the memory of a gateway 106a).

According to one or more aspects, a user may use user interface 800 to create and/or set a prioritization scheme according to which one or more segments of a particular program may be selectively recorded and/or deleted. For example, by manipulating program identifier 805, a user may specify a program for which and/or to which a prioritization scheme may be created and/or applied. Subsequently, by manipulating each current setting in the current setting listing 815, a user may specify a record and/or delete preference for each segment in the segment listing 810. Each preference in current setting listing 815 may be used by a device, such as gateway 106a, in selectively recording and/or deleting one or more segments of a particular program. For example, for the example program in FIG. 8, segment 810a may be recorded in accordance with current setting 815a being set to "Record," while segment 810e might not be recorded in accordance with current setting 815e being set to "Do Not Record." Thus, one or more aspects of the disclosure may allow a user to have the opening monologue of a late night talk show recorded, for example, but not the interview of the second guest, perhaps because the interview of the second guest is traditionally of less interest to the user.

In at least one arrangement, each segment in segment listing 810 may be retrieved, populated, recorded, and/or displayed automatically by a device generating user interface 800, such as gateway 106a. Additionally or alternatively, a user may define manually each segment in segment listing 810 for a particular program (e.g., the program identified in program identifier 805). In at least one additional arrangement, each setting in current setting listing 815 may be retrieved, populated, recorded, and/or displayed automatically by a device generating user interface 800, such as gateway 106a. For example, each setting in current setting listing 815 may represent a user's previous entry of preferences and/or may represent a default and/or suggested set of preferences.

In at least one additional arrangement, a device, such as gateway 106a, may monitor a user's content consumption habits and automatically set, based on these habits, a set of preferences in current setting listing 815 for a particular program identified in program identifier 805. For example, a device, such as gateway 106a, may monitor a user's content consumption habits with respect to the particular program identified in program identifier 805 (e.g., "The Jay Leno Show"). As a result of such monitoring, the device may determine that the user only selectively records and/or only selectively plays back segment 810a (e.g., the "Opening Monologue"), segment 810c (e.g., "Guest 1"), and segment 810f (e.g., "Closing Act"). Subsequently, the device automatically may implement a prioritization scheme for selectively recording and/or deleting one or more segments of the particular program (e.g., "The Jay Leno Show") in accordance with the determination made based on the monitoring. Thus, in this example, the device may set automatically current settings 815a, 815c, and 815f to "Record" and current settings 815b, 815d, and 815e to "Do Not Record," such that segments 810a, 810c, and 810f may be recorded, while segments 810b, 810d, and 810e might not be recorded.

Similarly, in at least one additional arrangement, a user's content consumption habits may be monitored, and based on these habits, one or more start triggers and/or segment triggers may be configured for the specific user. For example, a user may receive and/or consume content via a device, such as gateway 106a, and a server, such as server or processing location 102, may monitor the user's consumption habits. Subsequently, the server or processing location 102 may generate customized start triggers and/or segment triggers for the user based on the monitoring. For instance, the server or processing location 102 may increase or decrease the frequency of start triggers and/or segment triggers for the user based on determining that the user is more or less likely to be interested in particular programming, as based on the user's consumption habits. In another example, server or processing location 102 may generate customized start triggers and/or segment triggers for the user based on user preferences associated with one or more of the user's consumption devices (e.g., gateway 106a). For instance, the server or processing location 102 may determine which programs and/or segments the user has scheduled to record, and subsequently, the server or processing location 102 may increase the frequency of start triggers and/or segment triggers for those programs and/or segments for which recording has been scheduled and/or decrease the frequency of start triggers and/or segment triggers for those programs and/or segments for which recording has not been scheduled.

In at least one additional arrangement, a device (e.g., gateway 106a) that is configured to selectively record one or more segments of a particular program instead may record the particular program in its entirety if enough memory is available. On the other hand, a device (e.g., gateway 106a) automatically may selectively record one or more segments of a particular program based on a determination that not enough memory is available to record the particular program in its entirety.

In at least one additional arrangement, user interface 800 may allow a user to prioritize one or more segments of a particular program based on how much space is available in the memory of a recording device. For example, current setting listing 815 may allow a user of a device (e.g., gateway 106a) to choose selective recording options based on available memory, or the watched/unwatched status of programs in the memory (e.g. "Record If More Than 60% of Memory Is Free," "Record If More Than 20% of Memory Is Free," "Record If There Are Less Than 10 Unwatched Programs," and "Record If There Is Less Than 24 Hours of Unwatched Programming"). In this example, a user thus may specify that the opening monologue of "The Jay Leno Show" is to be recorded if more than 20% of the device's memory is free, while the interview of the first guest is to be recorded only if more than 60% of the device's memory is free. Thus, a user of a device (e.g., gateway 106a) further may prioritize the recording of segments of a particular program by choosing to record some segments of a particular program over other segments of the same program.

Figure 11:
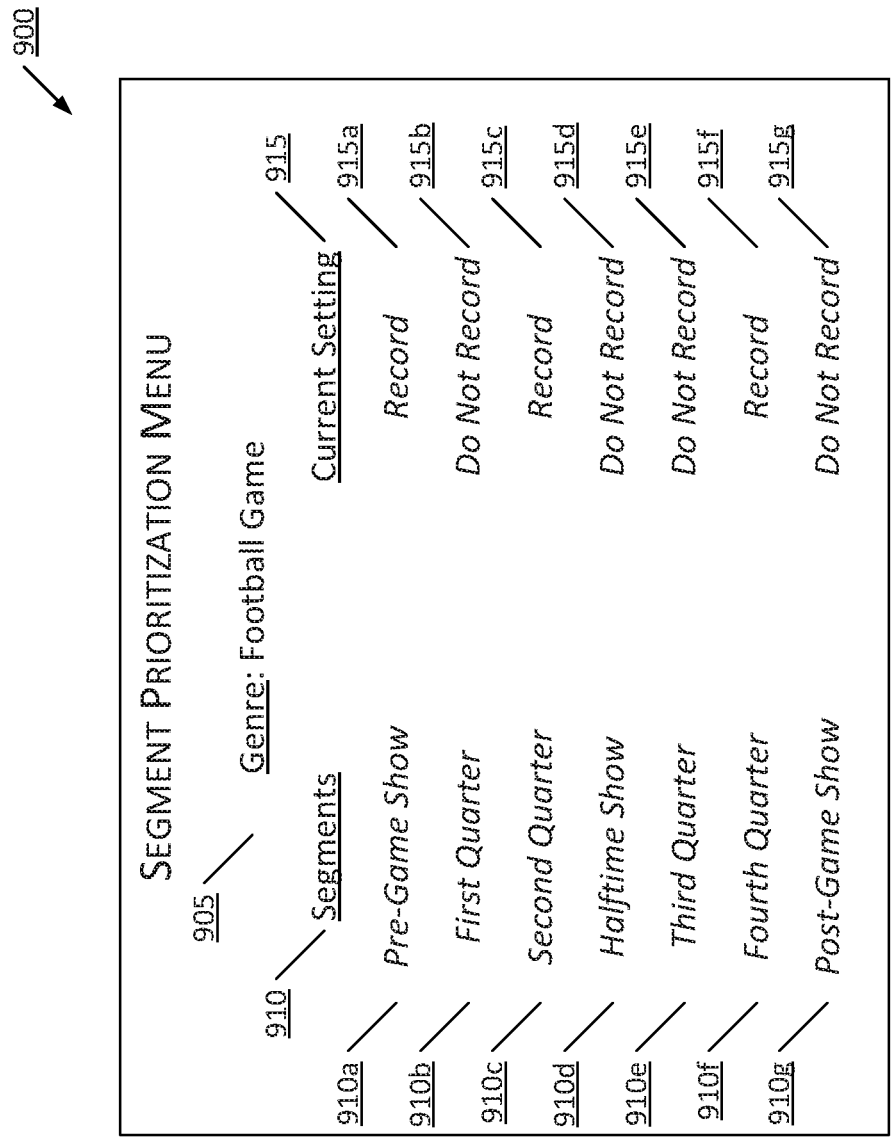
FIG. 11 illustrates a sample user interface in which one or more segments of a genre of programs may be prioritized according to one or more aspects described herein.

While FIG. 10 illustrates a user interface by which segments of a program may be prioritized, FIG. 11 illustrates a similar user interface that may be used to prioritize segments for entire genres of programs (e.g., sporting events, talk shows, movies, game shows, etc.). For example, FIG. 11 illustrates how segments of programs within the "Football Game" genre may be prioritized. By using user interface 900, a user may be able to specify, for example, that for all football games, the pregame show, second quarter, and fourth quarter are to be recorded. Such functionality may conserve storage space in the memory of a recording device (e.g., gateway 106a), as some football games may run several hours long.

In at least one additional arrangement, a device, such as gateway 106a, may monitor a user's content consumption habits and automatically set, based on these habits, a set of preferences in current setting listing 915 for a particular genre of programs identified in genre identifier 905. For example, a device, such as gateway 106a, may monitor a user's content consumption habits with respect to the particular genre of programs identified in genre identifier 905 (e.g., "Football Game"). As a result of such monitoring, the device may determine that the user only selectively records and/or only selectively plays back segment 910a (e.g., "Pre-Game Show"), segment 910c (e.g., "Second Quarter"), and segment 910f (e.g., "Fourth Quarter") of one or more programs within that genre of programs. Subsequently, the device automatically may implement a prioritization scheme for selectively recording and/or deleting one or more segments of one or more particular programs within the particular genre of programs (e.g., "Football Game") in accordance with the determination made based on the monitoring. Thus, in this example, the device may set automatically current settings 915a, 915c, and 915f to "Record" and current settings 915b, 915d, 915e, and 915g to "Do Not Record," such that segments 910a, 910c, and 910f may be recorded, while segments 910b, 910d, 910e, and 910g might not be recorded.

Figure 12:
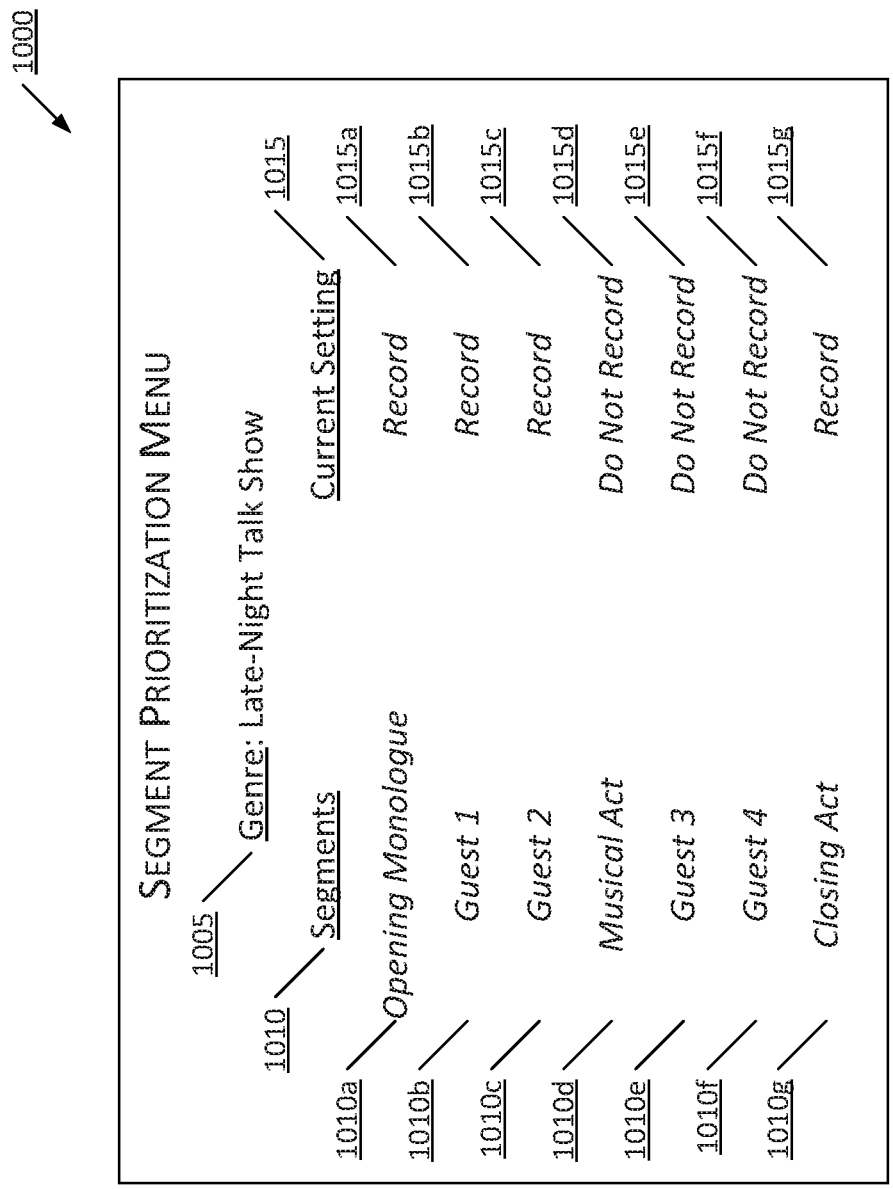
FIG. 12 illustrates a sample user interface in which one or more segments of a genre of programs may be prioritized according to one or more aspects described herein.

FIG. 12 illustrates a sample user interface in which one or more segments of a genre of programs may be prioritized according to one or more aspects described herein. Thus, user interface 1000 may include a genre identifier 1005, a segment listing 1010, and a current setting listing 1015.

According to one or more aspects, user interface 1000 may provide substantially similar functionality as user interface 900. User interface 1000 illustrates, however, how segment listing 1010 and current setting listing 1015 may differ from segment listing 910 and current setting listing 915, respectively, when a different genre of programs is selected (e.g., when genre identifier 1005 is set to "Late Night Talk Show" as opposed to when genre identifier 905 is set to "Football Game").

FIG. 13 illustrates a sample user interface in which prioritized segments of one or more programs may be displayed according to one or more aspects described herein. User interface 1100 may include one or more program listings, such as program listing 1105, program listing 1110, and program listing 1115.

According to one or more aspects, user interface 1100 may indicate that a set of segments of one or more segments of programs are to be recorded. In one or more arrangements, such an indication may be provided by variations in shading, variations in coloring, one or more other visual indicators, and/or the like. For example, in view of the example shading in FIG. 11, user interface 1100 may indicate that all of the segments of the program corresponding to program listing 1105 (i.e., "CSI: Miami") are to be recorded. Additionally, user interface 1100 may indicate that segments 1110a and 1110b of the program corresponding to program listing 1110 (i.e., "College Football") are to be recorded. Finally, user interface 1100 may indicate that segments 1115a, 1115b, and 1115c of the program corresponding to program listing 1115 (i.e., "The Jay Leno Show") are to be recorded.

In one or more arrangements, it may be optimal for a device implementing one or more aspects described herein, such as gateway 106a, to provide user interface 1100, as user interface 1100 may allow a user of such a device to view when which segments of which programs are set to be recorded. With such knowledge, a user may be able to know when such a device may be in use, and thus, a user may be able to further prioritize recording of one or more segments of one or more programs. For example, a device, such as gateway 106a, may have a limited number of tuners and thus might be able to record only a fixed number of segments of one or more programs simultaneously. Therefore, a situation may arise where a recording conflict exists between one or more segments because there might not be an available tuner to record one or more segments set to be recorded. In such a situation, the one or more recording conflicts may require resolution, and a user may choose which of one or more segments should be recorded and which should not be. In making such a choice or choices, a user thus may use user interface 1100 to view and/or resolve the one or more recording conflicts.

Figure 14:
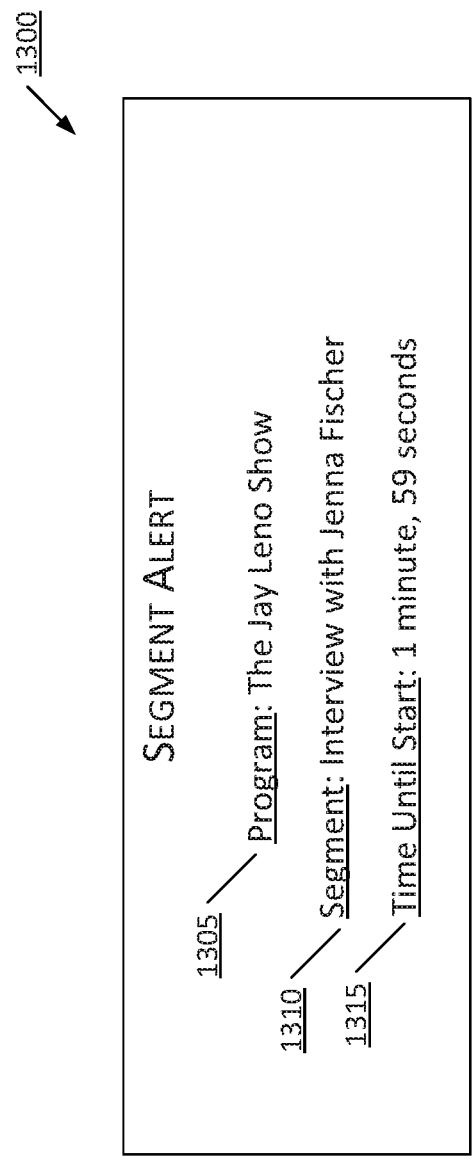
FIG. 14 illustrates a sample user interface in which a user may be alerted of an upcoming segment of a program according to one or more aspects described herein.

FIG. 14 illustrates a sample user interface in which a user may be alerted of an upcoming segment of a program according to one or more aspects described herein. User interface 1300 may include a program identifier 1305, a segment identifier 1310, and a segment start time identifier 1315.

According to one or more aspects, a user may configure a device implementing one or more aspects described herein, such as gateway 106a, to display user interface 1300 to alert the user of an upcoming segment of a particular program. For example, a user may configure gateway 106a to alert the user of an interview with Jenna Fischer on "The Jay Leno Show" two minutes before the interview is to start. Subsequently, as the start time of that particular segment approaches, and/or in response to receiving one or more start triggers and/or segment triggers corresponding to the particular program and/or the particular segment, gateway 106a may display user interface 1300. Additionally, program identifier 1305 may indicate that the alert corresponds to "The Jay Leno Show," segment identifier 1310 may indicate that the alert corresponds to the interview with Jenna Fischer, and segment start time identifier 1315 may indicate that the particular segment (e.g., the interview with Jenna Fischer) is to start in 1 minute and 59 seconds.

Figure 15:
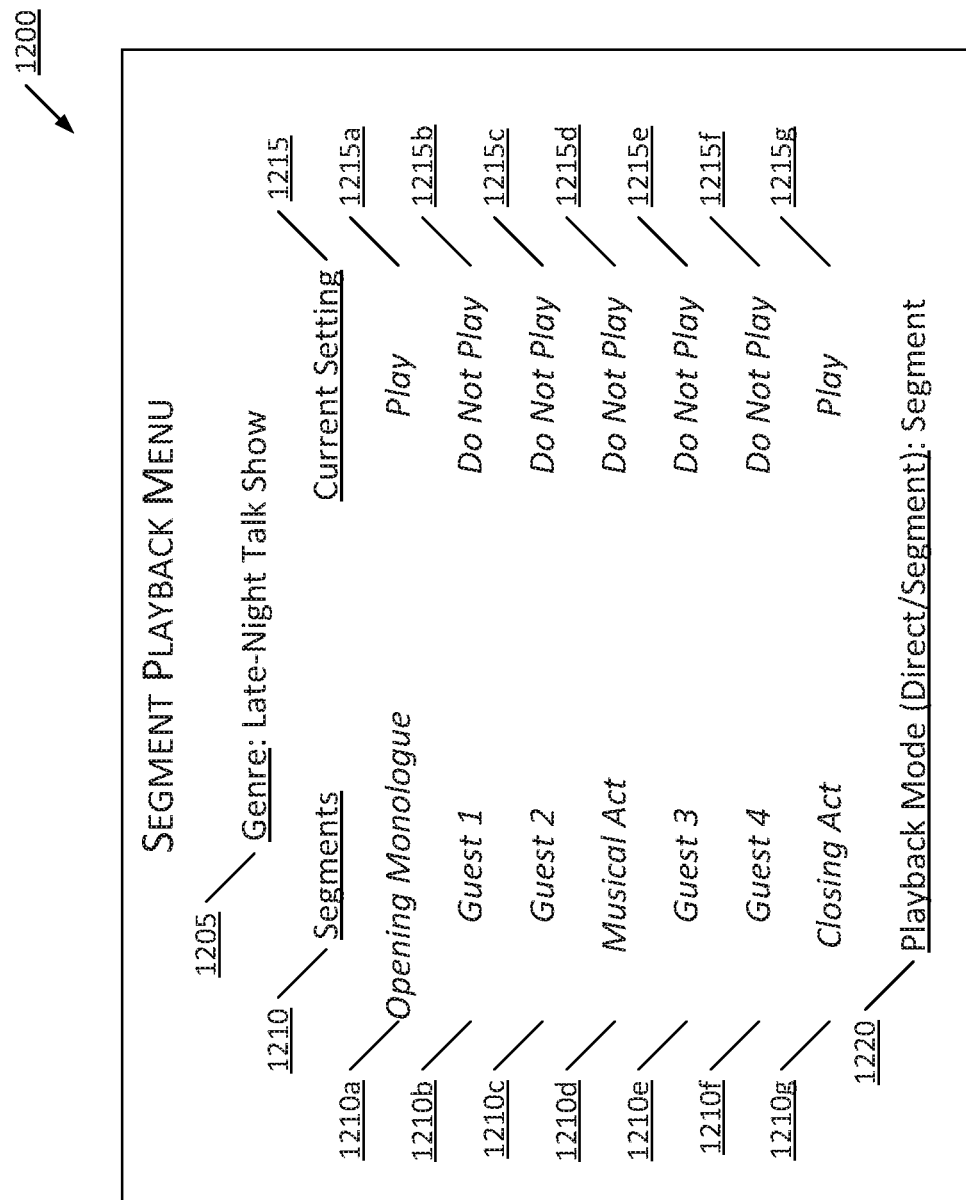
FIG. 15 illustrates a sample user interface in which playback of one or more segments of a program and/or of a genre of programs may be prioritized according to one or more aspects described herein.

FIG. 15 illustrates a sample user interface in which playback of one or more segments of a program and/or of a genre of programs may be prioritized according to one or more aspects described herein. User interface 1200 may include a genre identifier 1205, a segment listing 1210, a current setting listing 1215, and a playback mode identifier 1220. Via user interface 1200, a user may be able to navigate and selectively play back recorded segments, hopping from segment to segment via trickplay commands (e.g., fast forward) or through chapter selections from a menu.

According to one or more aspects, a user may use user interface 1200 to create and/or set a prioritization scheme according to which one or more segments of a particular genre of programs may be selectively played back. For example, by manipulating genre identifier 1205, a user may specify a genre of programs for which and/or to which a prioritization scheme may be created and/or applied. Subsequently, by manipulating each current setting in the current setting listing 1215, a user may specify a playback preference for each segment in the segment listing 1210. Each preference in current setting listing 1215 may be used by a device, such as gateway 106a, in selectively playing back one or more segments of one or more programs within a particular genre of programs. For example, for the example genre of programs in FIG. 12 (e.g., "Late Night Talk Show"), segment 1210a may be played back in accordance with current setting 1215a being set to "Play," while segment 1210e might not be played back in accordance with current setting 1215e being set to "Do Not Play." Such an arrangement may be desirable, as a user may wish to record programs in their entirety, but only play back certain segments of recorded programs at a particular time. While such an arrangement may consume more storage space on a recording device (e.g., gateway 106a), it would allow for more flexibility, because the recording device would be able to satisfy the user's playback preferences even as those preferences change over time.

In at least one additional arrangement, playback mode identifier 1220 may allow a user to select a direct playback mode. According to one or more aspects, a direct playback mode may involve playing back one or more of the recorded segments of the one or more programs within the selected genre (e.g., the genre indicated by genre identifier 1205) in the order in which the one or more recorded segments were originally recorded. In other words, the direct playback mode may involve playing back the one or more recorded segments by program. For example, given the example settings in current setting listing 1215 in FIG. 12, a direct playback mode may involve playing back an opening monologue segment of a first program, a closing act segment of the first program, an opening monologue segment of a second program, a closing act segment of the second program, and so on.

Additionally or alternatively, playback mode identifier 1220 may allow a user to select a segment playback mode. According to one or more aspects, a segment playback mode may involve playing back one or more of the recorded segments of the one or more programs within the selected genre (e.g., the genre indicated by genre identifier 1205) in the order in which the one or more segments are listed in segment listing 1210. In other words, the segment playback mode may involve playing back the one or more recorded segments by segment. For example, given the example settings in current setting listing 1215 in FIG. 12, a segment playback mode may involve playing back an opening monologue segment of a first program, an opening monologue segment of a second program, an opening monologue segment of a third program, a closing act segment of the first program, a closing act segment of the second program, and a closing act segment of the third program. In at least one configuration, the order in which segments may be played back also may depend on a priority scheme specifying the priority of one segment over at least one other segment. For instance, with respect to the previous example, a user may prioritize "closing act" segments over "opening monologue" segments, such that the segment playback mode may involve playing back the closing act segments of the first, second, and third programs before the opening monologue segments of the first, second, and third programs.

In at least one arrangement, when a user browses a listing of recorded programs and selects a recorded program from the listing for playback, the system (e.g., gateway 106*a*) may prompt the user to select a playback mode. In other words, when a user selects a recorded program for playback, a recording device, such as gateway 106*a*, may prompt the user to choose whether to play back the recorded program in its entirety or play back only prioritized segments of the program. For example, a user may select an episode of "The Jay Leno Show" from a listing of recorded programs available on a device (e.g., gateway 106*a*). Subsequently, the device may present a prompt to the user that asks the user to choose between playing back the episode in its entirety or only playing back certain prioritized segments of the episode, such as the "Opening Monologue" and the "Closing Act."

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus comprising:
   one or more processors; and
   memory storing instructions that, when executed by the one or more processors, cause the apparatus to:
   detect, in a transmission, a start trigger indicating a start time for a segment of content; and
   based on detecting the start trigger, record the segment of the content and transfer, from a buffer to a recording memory, a preceding portion of the content that precedes the segment.

2. The apparatus of claim 1, wherein there is another portion of the content between the preceding portion and the segment.

3. An apparatus comprising:
   one or more processors; and
   memory storing instructions that, when executed by the one or more processors, cause the apparatus to:
   store, in a buffer, content;
   detect, in a stream from a device providing the content, a trigger indicating a segment of the content; and
   based on the trigger:
   record, in a recording memory, the segment; and
   transfer, from the buffer to the recording memory, a portion of the content that precedes the segment.

4. The apparatus of claim 3, wherein the stream is different from a second stream comprising the content.

5. The apparatus of claim 3, wherein the stream is different from a second stream comprising the content, and wherein the trigger indicates the second stream.

6. The apparatus of claim 3, wherein the instructions, when executed, cause the apparatus to detect the trigger based on a determination that the segment is associated with a preference.

7. The apparatus of claim 6, wherein the instructions, when executed, further cause the apparatus to, prior to transferring the portion of the content that precedes the segment, determine that the segment is associated with a second preference.

8. The apparatus of claim 6, wherein the instructions, when executed, cause the apparatus to determine, based on a second preference, the portion of the content that precedes the segment.

9. The apparatus of claim 3, wherein the stream comprises a plurality of triggers indicating a plurality of segments of the content.

10. The apparatus of claim 3, wherein the stream comprises a second trigger indicating a second segment of second content different from the content.

11. The apparatus of claim 3, wherein the segment comprises a play within a sporting event, and the portion of the content that precedes the segment comprises another play that precedes the play.

12. The apparatus of claim 3, wherein the instructions, when executed, cause the apparatus to detect the trigger based on a determination that a segment recording is scheduled.

13. A system comprising:
   a device configured to transmit content; and
   a computing device comprising:
   one or more processors; and
   memory storing instructions that, when executed by the one or more processors, cause the computing device to:
   store, in a buffer, the content;
   detect, in a first transmission from the device, a trigger indicating a segment of the content; and
   based on the trigger:
   record, in a recording memory, the segment; and
   transfer, from the buffer to the recording memory, a portion of the content that precedes the segment.

14. The system of claim 13, wherein device is configured to transmit the content via a cable network.

15. The system of claim 13, further comprising:
the recording memory, wherein the recording memory is configured to:
receive, from the computing device, the portion of the content that precedes the segment; and
store the portion of the content that precedes the segment.

16. The system of claim 13,
wherein the instructions, when executed, further cause the computing device to receive a user preference indicating a play within a sporting event, and
wherein recording the segment comprises recording the play.

17. The system of claim 13,
wherein the instructions, when executed, further cause the computing device to receive a user preference indicating a team in a sporting event, and
wherein recording the segment comprises recording one or more portions of the content any time the team has possession of a ball in the sporting event.

18. The system of claim 13, wherein the first transmission is different from a second transmission comprising the content.

19. The system of claim 13, wherein the trigger indicates a second transmission comprising the content, wherein the second transmission is different from the first transmission.

20. The system of claim 13, wherein the first transmission comprises a plurality of triggers indicating a plurality of segments of the content.

21. The system of claim 13, wherein the first transmission comprises a second trigger indicating a second segment of second content different from the content.

22. The system of claim 13, wherein the instructions, when executed, further cause the computing device to, prior to detecting the trigger, determine that a segment recording is scheduled.

23. An apparatus comprising:
one or more processors; and
memory storing instructions that, when executed by the one or more processors, cause the apparatus to:
transmit, to a device, content; and
transmit, to the device and in a first transmission, a trigger indicating a segment of the content and configured to cause the device to record the segment and transfer, from a buffer to a recording memory, a portion of the content that precedes the segment.

24. The apparatus of claim 23, wherein the content comprises a video of a sporting event, and the segment corresponds to a play of the sporting event.

25. The apparatus of claim 23, wherein instructions, when executed, further cause the apparatus to:
transmit, to the device, a start trigger; and
based on a determination that a scheduling change has affected a start time of the content, transmit an updated start trigger.

* * * * *